United States Patent
Petilli (10) Patent No.: US 9,787,923 B2
(45) Date of Patent: Oct. 10, 2017

(54) CORRELATED DOUBLE SAMPLED (CDS) PIXEL SENSE AMPLIFIER

(71) Applicant: Intrinsix Corporation, Marlborough, MA (US)

(72) Inventor: Eugene M. Petilli, Victor, NY (US)

(73) Assignee: INTRINSIX CORPORATION, Marlborough, MA (US)

( * ) Notice: Subject to any disclaimer, the term of this patent is extended or adjusted under 35 U.S.C. 154(b) by 0 days.

(21) Appl. No.: 14/595,383

(22) Filed: Jan. 13, 2015

(65) Prior Publication Data

US 2015/0201141 A1    Jul. 16, 2015

Related U.S. Application Data

(60) Provisional application No. 61/926,442, filed on Jan. 13, 2014.

(51) Int. Cl.
    *H04N 5/369* (2011.01)
    *H04N 5/357* (2011.01)

(52) U.S. Cl.
    CPC ......... *H04N 5/3696* (2013.01); *H04N 5/3575* (2013.01)

(58) Field of Classification Search
    CPC .. H04N 5/378; H04N 5/37457; H04N 5/3696; H04N 5/3745; H04N 5/3575; H04N 3/155; H04N 5/3155; H04N 5/335; G01T 1/247; G01N 23/04; H01L 27/14609; H01L 27/14643; H01L 27/14603
    See application file for complete search history.

(56) References Cited

U.S. PATENT DOCUMENTS

| | | | | |
|---|---|---|---|---|
| 4,661,713 A | | 4/1987 | Besson et al. | |
| 4,786,831 A | * | 11/1988 | Morse | G01J 5/22 250/338.1 |
| 4,803,363 A | * | 2/1989 | Gaalema | G01J 5/34 250/338.4 |
| 5,233,180 A | * | 8/1993 | Tsuruta | H03K 17/785 250/208.1 |
| 5,291,293 A | | 3/1994 | Kapan | |

(Continued)

OTHER PUBLICATIONS

U.S. Appl. No. 14/539,607, filed Nov. 12, 2014, Petilli.

(Continued)

*Primary Examiner* — Luong T Nguyen
(74) *Attorney, Agent, or Firm* — Daly, Crowley, Mofford & Durkee, LLP (57) ABSTRACT

A correlated double sampled (CDS) pixel is provided. The CDS pixel comprises an image sensing device, an inverting amplifier, a capacitor, and first and second switches. The image sensing device generates charge based on image content. The inverting amplifier is in operable communication with the image sensing device. The capacitor is configured as a feedback to the inverting amplifier, wherein the first capacitor configured as a switching capacitor and configured to integrate an image signal received by the image sensing device. The first switch is in operable communication with the inverting amplifier and is configured to control sample timing of a correlated offset signal. The second switch is in operable communication with the image sensing device and is configured to control sample timing of the image signal.

20 Claims, 5 Drawing Sheets

(56) References Cited

U.S. PATENT DOCUMENTS

| | | | | |
|---|---|---|---|---|
| 5,363,055 A * | 11/1994 | Ribner | | H03G 3/001 |
| | | | | 327/306 |
| 5,602,511 A * | 2/1997 | Woolaway | | H03F 3/082 |
| | | | | 330/282 |
| 5,856,918 A * | 1/1999 | Soneda | | H02M 3/07 |
| | | | | 327/536 |
| 6,252,462 B1 * | 6/2001 | Hoffman | | G11C 7/1012 |
| | | | | 250/214 A |
| 6,455,831 B1 | 9/2002 | Bandera et al. | | |
| 6,491,372 B1 | 12/2002 | Shioya et al. | | |
| 6,952,004 B2 * | 10/2005 | Henderson | | H04N 5/3745 |
| | | | | 250/208.1 |
| 6,977,601 B1 | 12/2005 | Fletcher et al. | | |
| 7,183,531 B2 * | 2/2007 | Olsen | | H03F 3/08 |
| | | | | 250/208.1 |
| 7,492,400 B2 | 2/2009 | El Gamal et al. | | |
| 8,314,850 B2 | 11/2012 | Negishi et al. | | |
| 8,511,823 B2 | 8/2013 | Black et al. | | |
| 9,001,234 B2 | 4/2015 | Petilli | | |
| 2002/0180756 A1 | 12/2002 | Lee et al. | | |
| 2004/0095494 A1 * | 5/2004 | Mentzer | | H04N 5/335 |
| | | | | 348/308 |
| 2004/0257078 A1 | 12/2004 | Porter | | |
| 2006/0076473 A1 * | 4/2006 | Wilcken | | H04B 10/1121 |
| | | | | 250/214 A |
| 2007/0253695 A1 | 11/2007 | Miyazawa et al. | | |
| 2008/0317314 A1 | 12/2008 | Schwartz et al. | | |
| 2009/0091648 A1 * | 4/2009 | Lin | | H04N 5/335 |
| | | | | 348/301 |
| 2009/0195306 A1 * | 8/2009 | Chen | | H03F 3/005 |
| | | | | 330/9 |
| 2010/0208092 A1 | 8/2010 | Wang | | |
| 2010/0231767 A1 * | 9/2010 | Kikuchi | | H04N 5/355 |
| | | | | 348/301 |
| 2010/0283649 A1 | 11/2010 | Bos et al. | | |
| 2011/0090024 A1 * | 4/2011 | Chen | | H01G 4/38 |
| | | | | 333/174 |
| 2011/0150509 A1 | 6/2011 | Komiya | | |
| 2012/0051658 A1 | 3/2012 | Tong et al. | | |
| 2012/0113326 A1 | 5/2012 | Nagaraja et al. | | |
| 2012/0218445 A1 | 8/2012 | Petilli | | |
| 2013/0076553 A1 | 3/2013 | Kuo et al. | | |
| 2014/0095102 A1 | 4/2014 | Potyrailo et al. | | |
| 2015/0256768 A1 | 9/2015 | Dolgin et al. | | |

OTHER PUBLICATIONS

U.S. Appl. No. 14/490,448, filed Sep. 18, 2014, Petilli.

Maricic, Danijel; "Image Sensors Employing Oversampling Sigma-Delta Analog-to-Digital Conversion with High Dynamic Range and Low Power", Department of Electrical and Computer Engineering Arts, Sciences and Engineering, Edmund A. Hajim School of Engineering and Applied Sciences, University of Rochester, Rochester, NY, 2011, 136 pages.

Chen, Leonard, Hewitt, Mary, & Guibransen, Dave,& Pettijohn, Kevin, & Chen, Bryan, & Wyles, Richard of the Raytheon Infrared Center of Excellence. Overview of advances in high performance ROIC designs for use with IRFPAs, SPIE vol. 4028 (2000).

Das, Sankha dip, & Tan, Siew Li, & Zhang, Shiyong, & Goh, Yu Ling,& Tan, Chee Hing, & David, John of The Department of Electrical & Engineering, University of Sheffield. Development of LWIR Photodiodes Based on InAs/ GaSb Type II Strained Layer Superlattices. *6th EMRS DTC Technical Conference*—Edinburgh 2009.

Hill ,Cory J., & Soibel, Alexander, & Keo, Sam A., & Mumolo, Jason. M., & Gunapala, Sarath. D. of Jet Propulsion Laboratory, California Institute of Technology, & Rhiger, David R., & Kvaas, Robert E., & Harris, Sean F of Raytheon Vision Systems. Infrared Imaging Arrays Based on Superlattice Photodiodes. Infrared Technology and Applications XXXIV, edited by Bjørn F. Andresen, Gabor F. Fulop, Paul R. Norton, *Proc. of SPIE* vol. 6940, 69400C, (2008) • 0277-786X/08 doi: 10.1117/12.783934.

Johnson, J. L., & Samoska, L. A., & Gossard, A. C. of the Department of Electrical and Computer Engineering, University of California, Santa Barbara, & Merz, J. L. of The Department of Electrical Engineering, University of Notre Dame, & Jack, M. D., & Chapman, G. R., & Baumgratz, B. A., & Kosai, K., & Johnson, S. M. of The Santa Barbara Research Center. "Electrical and optical properties of infrared photodiodes using the InAs/Ga12xInxSb Superlattice in Heterojunctions with GaSb" *J. Appl. Phys.* 80 (2), Jul. 15, 1996 0021-8979/96/80(2)/1116/12/$10.00.

Kavusi et al., "Wuantitative Study of High Dynamic Range Sigma Delta-based Focal Plane Array Architectures", Department of Electrical Engineering, Stanford University, Stanford, CA 94305, Infrared Technology and Applications XXX, edited by Bjorn F. Andresen, Gabor F. Fulop, Proc. of SPIE vol. 5406 (SPIE, Bellingham, WA, 2004) 0277-786X/04/$15—doi: 10.1117/12.548875, 10 pages.

Kelly, Michael, & Colonero, Curtis, & Tyrrell, Brian, & Schultz, Kenneth of Lincoln Laboratory, Massachusetts Institute of Technology. The Digital Focal Plane Array (DFPA) Architecture for Data Processing "On-Chip" Mil. Sens. Symp.Detector Spec. Gp., Feb. 2007, This work was sponsored by the United States Government under Air Force contract FA8721-05-C-0002.

Smith, D.L., of the Los Alamos National Laoratory, & Maihiot, C.of the Xerox Webster Research, Webster, NY. Proposal for Strained Type II Superlattice Infrared Detectors *J. Appl. Phys.* 62(6), Sep. 15, 1987 0021-8979/87/182545-04.

Tennant, W.E., & Lee, Donald, & Zandian, Majid, & Piquett Eric, & Carmody, Michael of Teledyne Imaging Sensors. MBE HgCdTe Technology—A Very General Solution to IR Detection, Described by "Rule 07", a Very Convenient Heuristic, Mar. 21, 2008.

Tyrrell, Brian , & Berger, Robert, & Colonero, Curtis, &Costa, Joseph, & Kelly, Michael, & Ringdahl, Eric, & Schultz, Kenneth, & Wey, James of Lincoln Laboratory, Massachusetts Institute of Technology. Design Approaches for Digitally Dominated Active Pixel Sensors: Leveraging Moore's Law Scaling in Focal Plane Readout Design. This work was sponsored by the United States Government under Air Force contract FA8721-05-C-0002, (2008).

Tyrrell, Brian, & Anderson, Kirk, & Baker, Justin, & Berger, Robert, & Brown, Matthew, & Colonero, Curtis, & Costa, Joseph, & Holford, Brian, & Kelly, Michael, & Ringdahl, Eric, & Schultz, Kenneth , & Wey, James. Time Delay Integration and In-Pixel Spatiotemporal Filtering Using a Nanoscale Digital CMOS Focal Plane Readout. *IEEE Transactions on Electron Devices*, vol. 56, No. 11, Nov. 2009.

Zheng, L., & Tidrow, M. Z., & Novello, A., & Weichel, H., Vohra, S. Type II Strained Layer Superlattice: A Potential Infrared Sensor Material for Space. Quantum Sensing and Nanophotonic Devices V, edited by Rengarajan Sudharsanan, Christopher Jelen. *Proc. of SPIE* vol. 6900, 69000F, (2008) • 0277-786X/08 • doi: 10.1117/12.768420.

U.S. Appl. No. 14/490,448 Notice of Allowance dated Jan. 29, 2016, 22 pages.

U.S. Appl. No. 14/539,607 Office Action dated May 25, 2016, 6 pages.

U.S. Appl. No. 14/539,607 Response to Restriction Requirement filed Jul. 18, 2016, 1 page.

U.S. Appl. No. 14/539,607 Preliminary Amendment filed Jul. 25, 2016, 14 pages.

U.S. Appl. No. 14/539,607 Office Action dated Aug. 17, 2016, 12 pages.

U.S. Appl. No. 14/539,607 Response to Ex Parte Quayle Office Action filed Oct. 13, 2016, 12 pages.

U.S. Appl. No. 14/539,607, Notice of Allowance and Issue Fee due dated Nov. 8, 2016, 8 pages.

Notice of Allowance dated Mar. 28, 2016; for U.S. Appl. No. 14/666,434; 20 pages.

U.S. Appl. No. 14/666,434, filed Mar. 24, 2015, Petilli.

Notice of Allowance dated Sep. 5, 2014; for U.S. Appl. No. 13/405,406; 10 pages.

Request for Continued Examination dated Oct. 18, 2014; for U.S. Appl. No. 13/405,406; 2 pages.

Notice of Allowance dated Dec. 4, 2014; for U.S. Appl. No. 13/405,406; 11 pages.

312 Amendment dated Feb. 12, 2015; for U.S. Appl. No. 13/405,406; 6 pages.

\* cited by examiner

CORRELATED DOUBLE SAMPLED (CDS) PIXEL SENSE AMPLIFIER

CROSS-REFERENCE TO RELATED APPLICATIONS

This application claims priority to U.S. Provisional Application filed on Jan. 13, 2014, having Ser. No. 61/926,442, by Eugene M. Petilli, entitled "A Correlated Double Sampled (CDS) Pixel Sense Amplifier," which is hereby incorporated by reference in its entirety.

It is envisioned that the embodiments described herein also could be combined with some or all of the technologies described in the commonly assigned U.S. Pat. No. 7,215,270, entitled "Sigma-Delta Modulator having selectable OSR with Optimal Resonator Coefficient,"; U.S. Pat. No. 7,576,671, entitled "Mismatch-shaping Dynamic Element Matching Systems and Methods for Multi-bit Sigma-delta Data Converters,"; U.S. Pat. No. 7,605,652, entitled "Sigma-delta, Based Class D Audio Power Amplifier with High Power Efficiency,"; U.S. Pat. No. 7,612,608, entitled "Sigma-delta Based Class D Audio or Servo Power Amplifier with Load Noise Shaping,"; U.S. Pat. No. 7,860,189, entitled "Hybrid Heterodyne Transmitters and Receivers," U.S. Pat. No. 8,379,760, entitled "Hybrid Heterodyne Transmitters and Receivers," U.S. Patent Publication US-2012-0218445-A1, entitled "Imager Readout Architecture Utilizing A/D Converters," the provisional patent application entitled "Foveal Imager Readout Integrated Circuit (ROIC)," application Ser. No. 61/879,276, by Eugene M. Petilli, filed on Sep. 18, 2013 and converted to a nonprovisional patent application having Ser. No. 14/490,448 on Sep. 18, 2014 (hereinafter "Foveal ROIC application"), now U.S. Pat. No. 9,344,660, issued May 17, 2016); and the provisional patent application entitled "Stacked Photodiode Multispectral Imager," application Ser. No. 61/902,912, by Eugene M. Petilli, filed on Nov. 12, 2013 and converted to a nonprovisional patent application having Ser. No. 14/539,607 filed on Nov. 12, 2014, having a publication number of US-2015-0129747-A1. The contents of each of these above-listed patents and patent applications are hereby incorporated by reference in their entirety.

STATEMENT REGARDING FEDERALLY SPONSORED RESEARCH

Not applicable

FIELD

At least some embodiments described herein generally relate to devices, systems, and methods for interfacing to image sensing elements. More particularly, at least some embodiments relate to devices, systems and methods that use charge to represent image intensity and convert the charge into a voltage for transmitting to additional processing circuits such as an analog-to-digital converter (ADC).

BACKGROUND

Conventional photodiode based imagers, such as active pixel or complementary metal-oxide-semiconductor (CMOS) sensors, utilize a photodiode and a three (3T) or four transistor (4T) sense amplifier per pixel architecture to provide a low impedance representation of the intensity of light that illuminated the photodiode. This picture element, or pixel, is replicated into an X by Y array of pixels which forms a focal plane array (FPA). As is known in the art (e.g., as mentioned in the aforementioned and incorporated by reference Foveal ROIC application), an array of photodiodes is sometimes referred to as a detector array.

Figure 1:
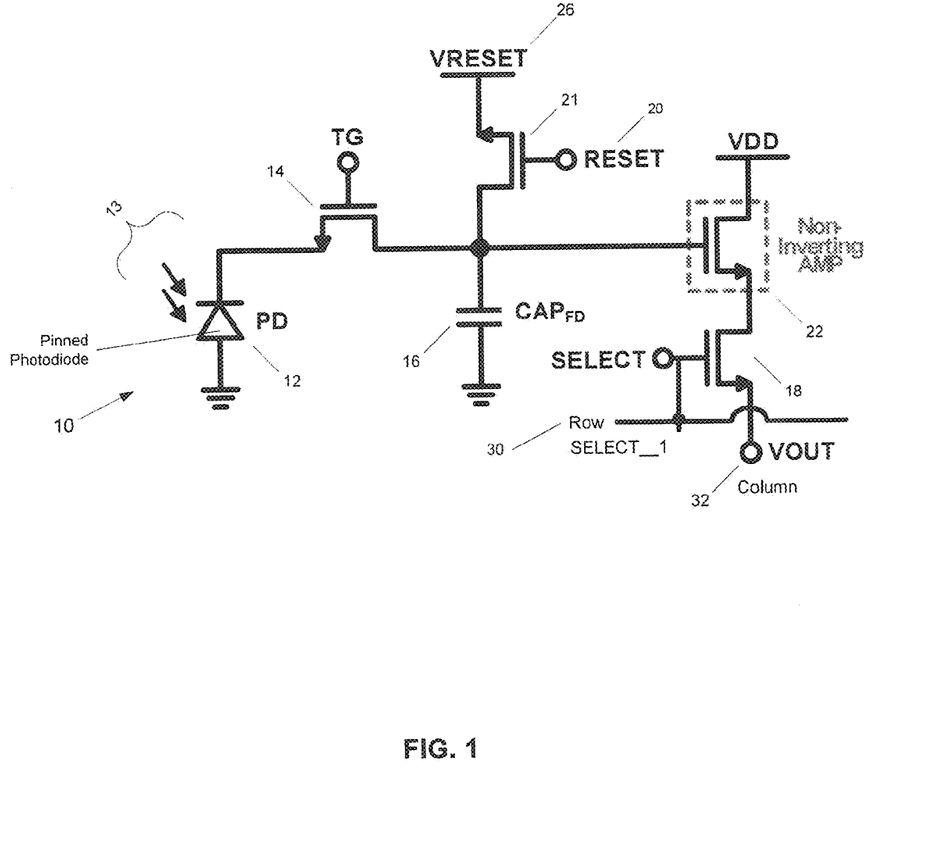
FIG. 1 is a general block diagram of a prior art pixel using a source follower (SF) amplifier circuit.

The PN junction (also known in the art as a p-n junction) of the photodiode (PD) has a parasitic capacitance, which varies with the reverse bias voltage across the PD. The PD's junction is often a p-i-n junction; that is, the PD is designed to deplete or drain out all of the charge from its collection region at a certain voltage. A p-i-n junction helps to optimize the PD's quantum efficiency, capacitance and linearity. FIG. 1 is a diagram of a standard 4T pixel 10, as is known in the prior art, and includes a p-i-n junction PD 12, a transfer gate (TG) transistor 14, a storage capacitor 16, a source follower (SF) transistor 22, a select transistor 18, and a reset transistor 21 that is responsive to a RESET signal 20. Referring to FIG. 1, first, a reset phase, controlled by the reset transistor 21, is used to clear any previous charge stored on the PD 12. Then, the voltage across PD 12 (and floating diffusion [FD] capacitor, $CAP_{FD}$, 16) is initialized to a known reverse bias during another reset phase, controlled by turning on both the TG transistor 14 and reset transistor 21.

During an integration phase, the TG transistor 14 is opened, disconnecting the bias source (VRESET 26) from the PD 12, leaving the initial charge stored on the parasitic PD capacitor. When a photon 13 hits the PD 12, it is converted into some number of electrons, each with a charge of one electron volt. The charge is accumulated in the parasitic capacitance, which changes the voltage across the PD 12. The time during which the charge is allowed to accumulate is referred to as the integration time.

During a TG phase, controlled by the TG transistor 14, the charge accumulated on the PD 12 is moved from the PD 12 to the storage capacitor, $CAP_{FD}$ 16, which is often fabricated from FD. The voltage across $CAP_{FD}$ 16 is presented to the gate node of a MOS device 22 which is connected as a non-inverting common drain amplifier, referred to as the SF 22. The SF 22 provides power gain by transforming the high impedance charge into a low impedance voltage output. There is a series row select transistor 18 which enables the SF 22 to drive an output bus (not shown in FIG. 1, but which is in operable communication with the row 30 and column 32 that receive respective row and column select signals, such as row select signal SELECT_1 as shown in FIG. 1), which is shared with other pixels that are typically from the same column. At the end of the output bus 32 is a current sink (not shown in FIG. 1) which biases the one SF 22 that is selected. For example, in one embodiment, the source of the select transistor 18 is connected to a column-based output bus 32. The SELECT_1 signal selects which of the N rows places its voltage on the M column buses 32. Normally, only one row of an array is enabled at a time. This configuration is sometimes referred to as a wired-OR, tri-state or one-hot bus.

The output or column bus 32 can be used to drive a correlated double sampling (CDS) amplifier (not shown in FIG. 1) which is used to remove the spatial error created by the offset variations and 1/f noise of the multiple SFs 22 that are sequentially driving the output bus 32. The output of the SF 22 is sampled first after the reset phase (but before the TG phase) to store the "residual" offset from the reset. A second sample is taken after the TG phase to store the signal, plus offset and noise. The stored offset and signal voltages are subtracted (correlated) to remove the error sources, leaving only the signal, which represents the light intensity.

SUMMARY

The following presents a simplified summary in order to provide a basic understanding of one or more aspects of the disclosed embodiments. This summary is not an extensive overview of the embodiments described herein, and is neither intended to identify key or critical elements of these embodiments, nor to delineate the scope thereof. Rather, the primary purpose of the summary is to present some concepts of the disclosed embodiments in a simplified form as a prelude to the more detailed description that is presented later.

In addition, at least some of the embodiments described herein are intended to be usable with many different types of systems that use photodiodes (PDs), including imaging systems, especially those that are based on sigma-delta modulators (SDMs), as well as many different types of sensing systems, amplifiers, etc.

In one embodiment, a correlated double sampled (CDS) pixel is provided, the CDS pixel comprising an image sensing device, an inverting amplifier, a first capacitor, a first switch, and a second switch. The image sensing device generates charge based on image content. The inverting amplifier is in operable communication with an output of the image sensing device, where the inverting amplifier comprises an inverting input and an amplifier output. The first capacitor is configured as a feedback to the inverting input of the inverting amplifier, where the first capacitor is configured as a switching capacitor and is configured to integrate an image signal received by the image sensing device. The first switch is in operable communication with the inverting amplifier and is configured to control sample timing of a correlated offset signal. The second switch is in operable communication with the image sensing device and is configured to control sample timing of the image signal.

In a further embodiment, the image sensing device comprises a photodiode. In other embodiments, the inverting amplifier comprises either a common source negative channel metal-oxide-semiconductor (NMOS) transistor or a common source positive channel metal-oxide-semiconductor (PMOS) transistor. In another embodiment, the first capacitor comprises a device that is formed at least in part using a metal-insulator-metal (MIM) capacitance.

In a further embodiment, the CDS pixel comprises a third switch operably connected to the inverting amplifier as a virtual short between its inverting input and its output, wherein the virtual short is configured to help control integration time. In a still further embodiment, the CDS pixel further comprises a fourth switch operably connected to the output of the inverting amplifier, the fourth switch configured to enable one or both of the first CDS pixel and a plurality of second CDS pixels to output onto an open drain output bus. The CDS pixel also can comprise, as shown and described further herein, a fifth switch in series between a source of dark voltage (VDARK) and the feedback capacitor 58.

In another embodiment of the CDS pixel, the charge is first accumulated by the image sensing device before being transferred to the first capacitor. In another embodiment, the image sensing device further comprises a second capacitor constructed and arranged to increase a charge capacity of the image sensing device. For example, in one embodiment the second capacitor is connected in parallel with the image sensing device.

In a still further embodiment of the CDS pixel, the image sensing device is fabricated on a monolithic wafer, wherein the inverting amplifier is also fabricated on the same monolithic wafer as the image sensing device. In another embodiment, the image sensing device is fabricated separately from the inverting amplifier, wherein the image sensing device is configured to be on top of a monolithic wafer that has been fabricated using microelectromechanical systems (MEMS) technology. In a still further embodiment, the image sensing device is configured to be fabricated on a separate wafer from the inverting amplifier and first capacitor, wherein the separate wafer on which the image sensing device is fabricated is hybridized to the CDS wafer. In yet another embodiment, the image sensing device is configured to be fabricated on a first wafer, the inverting amplifier and first capacitor are fabricated on a second wafer, and the first and second wafers are hybridized into a first focal plane array (FPA).

In another embodiment, the inverting amplifier and first capacitor are configured as a capacitive transimpedance amplifier (CTIA). For example, in one embodiment, the first and second switches are configured to time the correlated offset signal and image signal so that the CTIA operates as a CDS CTIA, wherein the first capacitor is configured to store the offset signal during a first time period and to store the image signal during a second time period.

In another aspect, a method for sensing an image is provided. A CDS pixel is provided, the CDS pixel in operable communication with an output bus. The CDS pixel comprises an image sensing device, an inverting amplifier, a first capacitor, a first switch, and a second switch. The image sensing device generates charge based on image content. The inverting amplifier is in operable communication with an output of the image sensing device, where the inverting amplifier comprises an inverting input and an amplifier output. The first capacitor is configured as a feedback to the inverting input of the inverting amplifier, where the first capacitor is configured as an integrating capacitor and is configured to integrate an image signal received by the image sensing device. The first switch is in operable communication with the inverting amplifier and is configured to control sample timing of a correlated offset signal. The second switch is in operable communication with the image sensing device and is configured to control sample timing of the image signal. A voltage across the image sensing device is set to a first predetermined value. A voltage across the first capacitor is initialized to a second predetermined value. The output of the CDS pixel is disconnected from the output bus. Charge is accumulated on the image sensing device, wherein the charge is related to a detected image intensity. The second predetermined value of voltage across the first capacitor is correlated to a virtual short at the input of the inverting amplifier. The CDS pixel output is reconnected to the output bus. The image sensing device is coupled to the inverting input of the inverting amplifier, wherein the coupling combines, at the inverting input of the inverting amplifier, the stored charge from the image sensing device with the correlated voltage across the first capacitor, so as to transfer enough charge from the image sensing device to return the image sensing device to the first predetermined value.

In a further embodiment, the inverting amplifier and first capacitor are configured as a CTIA. In a still further embodiment, the first and second switches are configured to time the correlated offset signal and image signal (e.g., the sample timing of an image signal), respectively, so that the CTIA operates as a CDS CTIA, wherein the first capacitor is configured to store the offset signal during a first time period and to store the image signal during a second time period. In yet another embodiment, the first capacitor is operably coupled to the image sensing device a plurality of times during the time when the image sensing device is accumulating charge, and an integration time is defined as the time from when the image sensing device to is returned to the first predetermined value to the time an image signal voltage is read.

Details relating to this and other embodiments are described more fully herein.

BRIEF DESCRIPTION OF THE DRAWINGS

The advantages and aspects of the disclosed embodiments will be more fully understood in conjunction with the following detailed description and accompanying drawings, wherein.

In the drawings, like reference numbers indicate like elements, and like or related elements will have like or related alpha, numeric or alphanumeric designators.

DETAILED DESCRIPTION

Embodiments described herein include, but are not limited to, systems, methods, apparatuses, and articles of manufacture that relate to the design of sense amplifiers and related applications which may benefit from the use of correlated double sampling (CDS) to minimize, or at least reduce, noise and offset variations and to increase signal power gain of the system, method, and/or apparatus. Embodiments of the sense amplifier systems, methods, and apparatuses have numerous applications, including, but not limited to, photodiode (Si, Ge, InGaAs, strained layer superlattice [SLS]) pixel arrays, focal plane arrays (FPAs), charge coupled device (CCD) imagers, active complementary metal oxide semiconductor (CMOS) imagers, capacitive touch sensors, microbolometers, and related applications. At least some embodiments of the sense amplifier described herein further include embodiments that receive an analog current or charge signal as an input and provide an analog voltage signal to an external load.

Embodiments which use a similar process technology for fabrication of the image sensing device and the sense amplifier readout integrated circuit (ROIC) are, in at least some embodiments, fabricated either as a monolithic device or on two wafers which are hybridized into one FPA. Hybridization often involves adding "bumps" to the wafers, flipping the image sensing wafer and bonding the wafers together. The flipped image sensing wafer is used in a "back side" image collection mode. In some embodiments, the base wafers are made using the same process technologies. In some embodiments, the base wafers are made using different process technologies. Other embodiments use a microelectromechanical systems (MEMS) process to add image sensing devices, such as microbolometers, to the top side of the ROIC.

Figure 2:
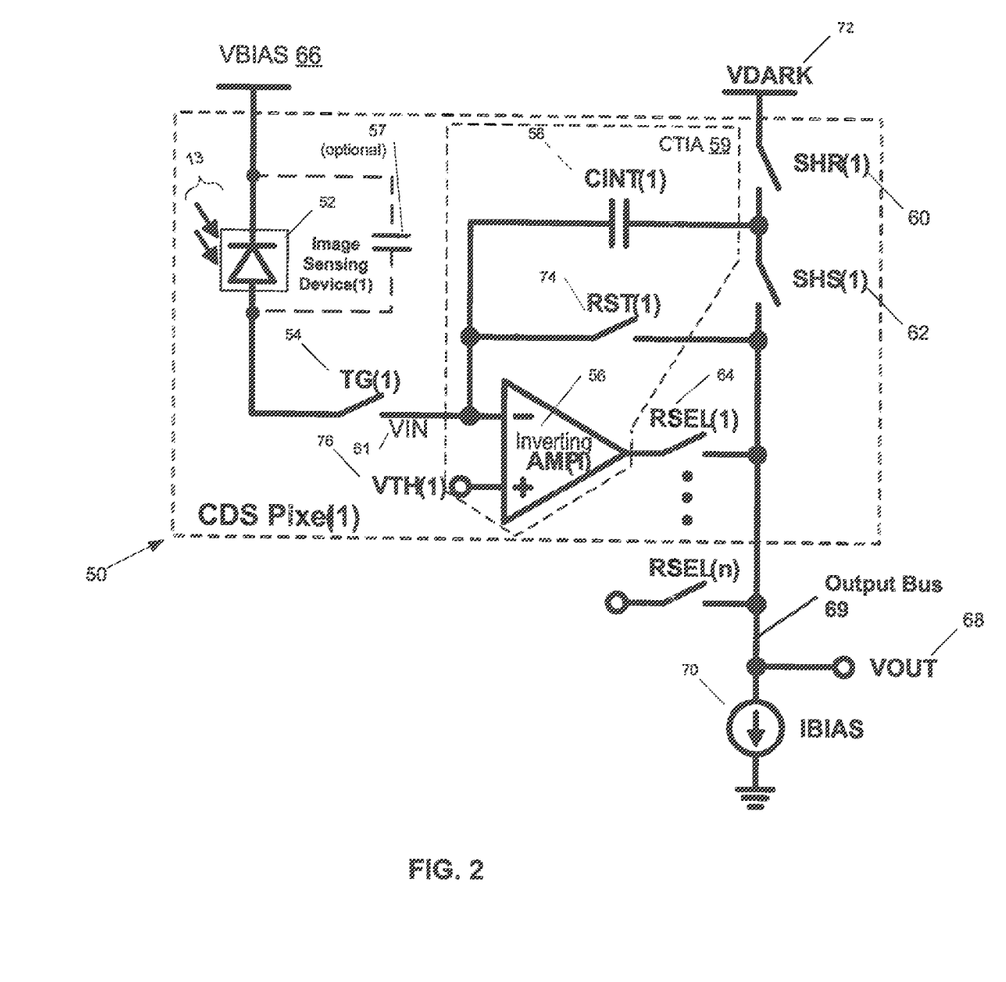
FIG. 2 is a block diagram of a first embodiment which uses a differential amplifier to form a correlated double sampling (CDS) pixel's inverting amplifier circuit.

FIG. 2 is a block diagram of a CDS Pixel 50 in accordance with a first embodiment. Each pixel in a row has its own corresponding CDS Pixel 50; reference to the first CDS Pixel is made by referring to it as CDS Pixel(1) 50, with each component in CDS Pixel(1) 50 similarly identified, e.g., image sensing device(1) 52. The CDS Pixel(1) 50 includes an image sensing device 52 (shown for illustrative purposes only as photodiode [PD]), a transfer gate (TG) switch, TG(1) 54, an inverting amplifier, Inverting AMP(1) 56 (which can, for example, be implemented using a common source [CS] amplifier), a feedback capacitor, CINT(1) 58 (also referred to herein as integrating capacitor 58), a sample-and-hold reset (SHR) switch, SHR(1) 60, a sample-and-hold sample switch (SHS), SHS(1) 62, a row select switch, RSEL(1) 64, and a reset (RST) switch, RST(1) 74. The CDS Pixel(1) 50 circuit is connected to a bias voltage for the image sensing device, VBIAS 66, a source of bias voltage for inverting amplifier 56 (also referred to herein as a source of threshold voltage), VTH(1) 76, a common output current load, IBIAS 70, and VDARK 72, which is a source of the desired zero input charge output voltage, also referred to herein as dark voltage. The CDS Pixel(1) 50 provides an output voltage, VOUT 68.

Figure 3:
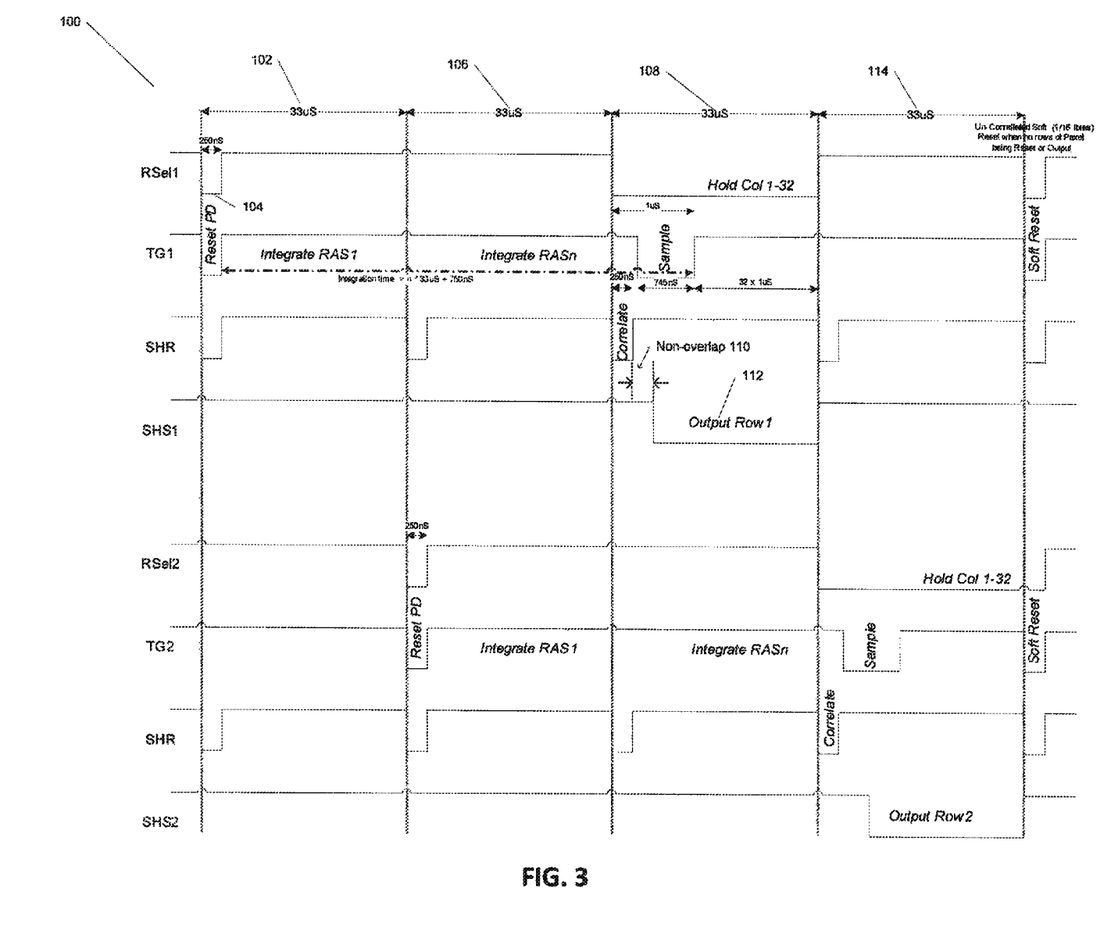
FIG. 3 is a timing diagram showing the control signals and phases for multiple CDS pixel rows on a single column output bus, for the first embodiment of FIG. 2.

In one embodiment, SHR(1) 60 is in operable communication with the Inverting AMP(1) 56 and is configured to control the sample timing of a correlated offset signal, as described further herein in connection with FIG. 3. As shown in FIG. 3, the SHS(1) 62 switch cooperates with other signals to output row 1, as described herein. In one embodiment, switch TG(1) 54 is in operable communication with both the image sensing device(1) 52 (e.g., PDs or any other image sensing device) and the inverting input of Inverting AMP(1) 56, and is configured to control the sample timing of an image signal. Switch RST(1) 74 is configured to reset integrating capacitor CINT(1) 58 by creating, when closed, a virtual short across the Inverting AMP(1) 56, thereby helping to contribute towards controlling the integration time. Switch RSEL(1) 64 is operably connected to the output of the Inverting Amp (1) 56 and is configured to enable CDS Pixel(1) 50 (or even other CDS Pixels) to output onto the output bus 69 to Vout 68.

Referring still to FIG. 2, described further below, at least some embodiments described herein help address the offset and noise error sources introduced by the source follower (SF) 22 (of FIG. 1) by replacing the SF 22 with a capacitive transimpedance amplifier (CTIA) 59, formed as shown via dotted line in FIG. 2 and as previously described with an inverting amplifier (e.g., the Inverting AMP 56 of FIG. 2) plus a capacitive feedback element 58 (also referred to herein as integrating capacitor CINT(1) 58). By careful selection of timing signals, it is possible to convert a simple CTIA into a CDS CTIA 59 using a single capacitor 58 to store the offset and the signal, much like a chopper-stabilized gain amplifier. This correlation occurs in the CDS Pixel 50 at the interface between the image sensing device 52 and the inverting input (VIN 61) of the Inverting AMP 56 that is built into the CDS Pixel 50, as shown in FIG. 2. This is different than the four transistor (4T) pixel of FIG. 1, which requires a separate sample capacitor(s) and a CDS amplifier after the SF 22 at the output of the column bus.

As shown in the exemplary embodiment of FIG. 2, an inverting amplifier 56 (which in this example is implemented using a differential amplifier) replaces the SF 22 of FIG. 1 and forms the amplifier required for the CTIA 59. Note that the exemplary embodiment of FIG. 2 is intended to represent a general configuration of a CDS Pixel 50, and is not limited to implementations that use differential amplifiers or CS amplifiers as the Inverting AMP 56, as will be appreciated. The specific type of amplifier used for the Inverting AMP 56 is not important, although advantageously, this amplifier should be an inverting amplifier (in contrast to a standard SF, which is non-inverting).

Figure 4:
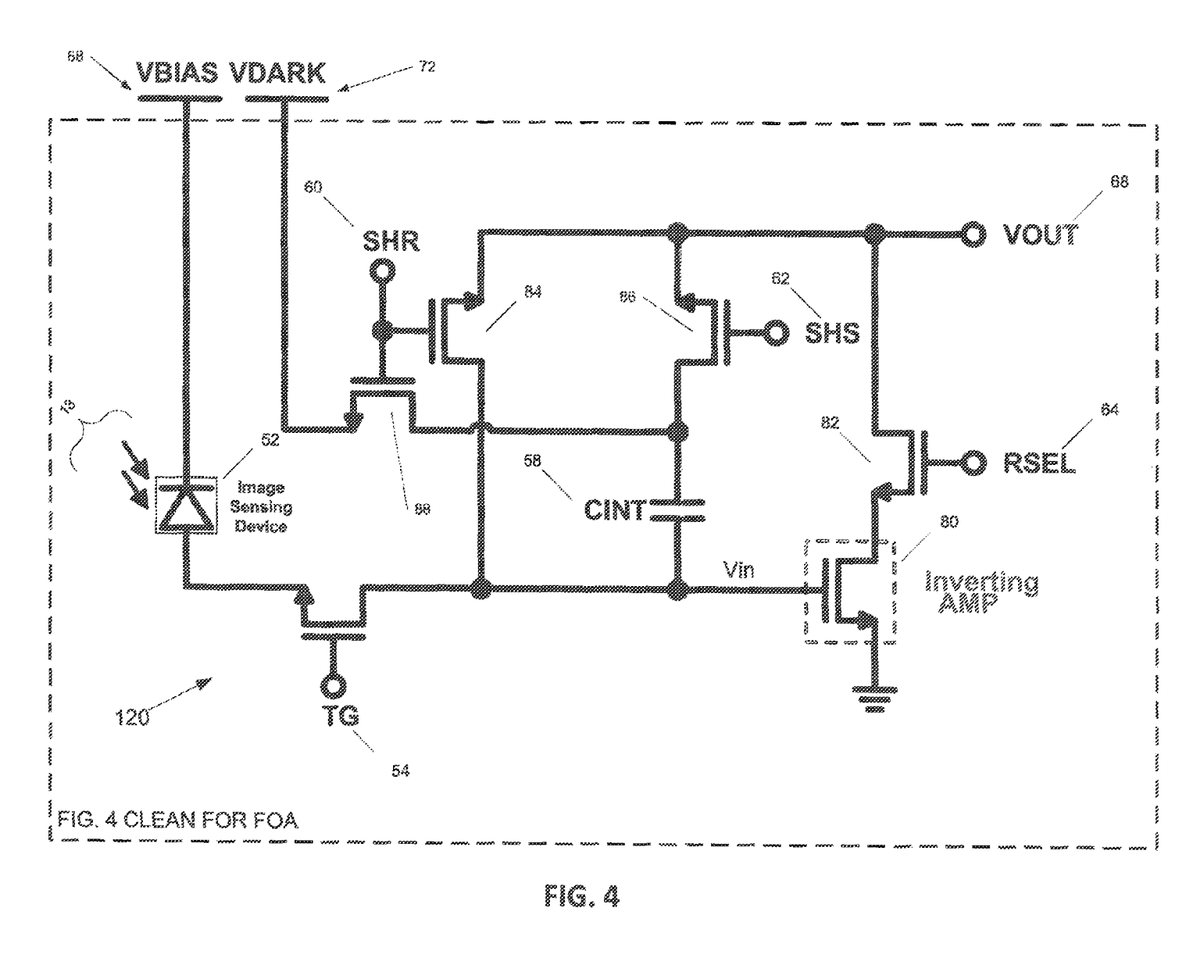
FIG. 4 is a block diagram of a second embodiment using NMOS devices and replacing the differential amplifier of FIG. 2 with an inverting common source (CS) amplifier.
Figure 5:
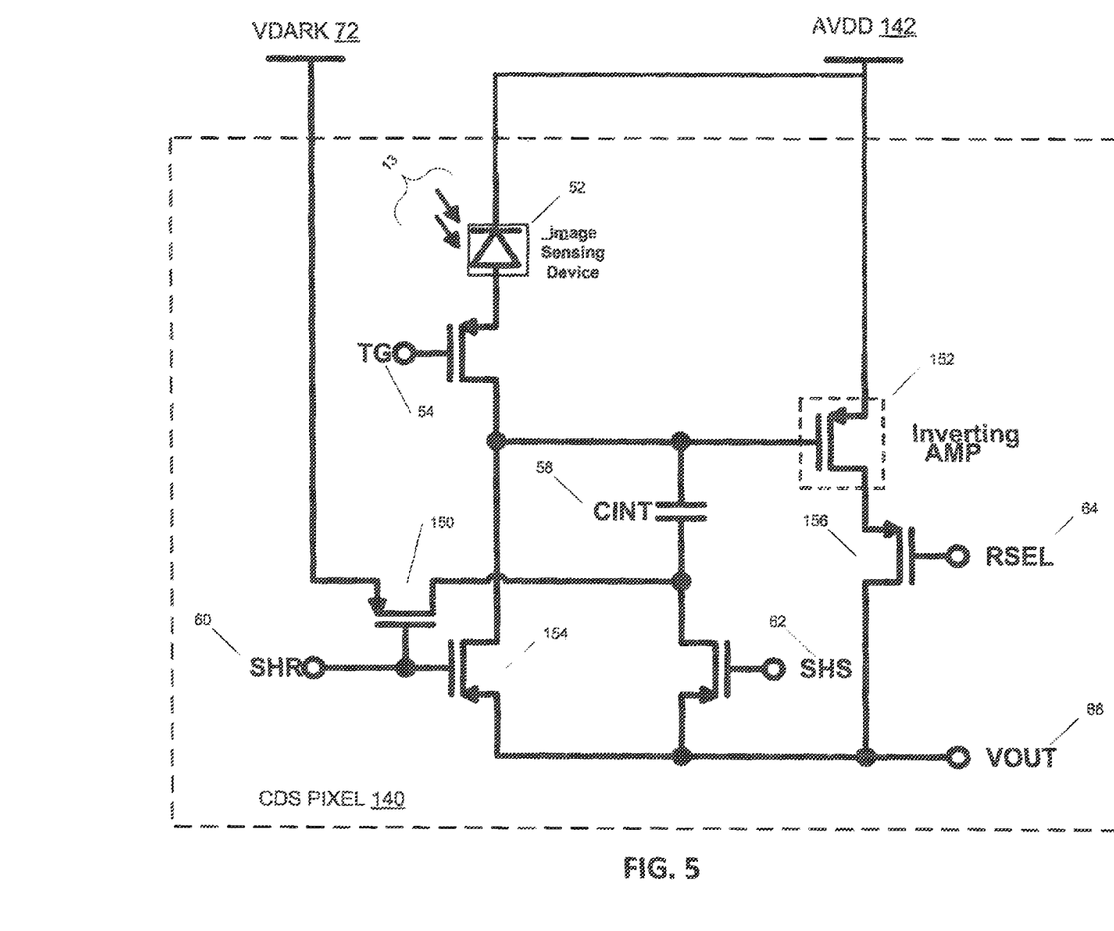
FIG. 5 is a block diagram of a third embodiment using PMOS devices and replacing the differential amplifier of FIG. 2 with an inverting CS amplifier.

Referring again to FIG. 2, the exemplary inverting AMP 56 can be made using an negative metal-oxide-semiconductor (NMOS) transistor 80 (see NMOS CDS Pixel 120 of FIG. 4, described further herein) or a positive metal-oxide-semiconductor (PMOS) transistor 152 (see PMOS CDS Pixel 140 of FIG. 5, described further herein). As the configurations of FIGS. 4 and 5 illustrate, when using NMOS or PMOS transistors to implement the Inverting AMP 56 of the respective NMOS CDS Pixel 120 or PMOS CDS Pixel 140, the circuit does not have to include the VTH 76 of FIG. 2. Referring again to FIG. 2, the capacitive feedback element 58 is, in one advantageous embodiment, fabricated using a metal-insulator-metal (MIM) capacitor instead of using floating diffusion (FD), but this is not limiting.

The value of the capacitance 58 defines the input charge-to-output voltage gain of the CTIA. Switches are used to first sample a charge, representing the offset voltage, onto the MIM capacitor 58 during a reset phase. In the transfer phase, the image sensing device 52 charge is transferred to the MIM capacitor 58 and the stored offset charge is subtracted from the output by the action of the Inverting AMP 56 in the CTIA. The output signal (minus offset and 1/f noise), VOUT 68, is enabled onto the output bus 69 by the output select RSEL(1) switch 64. Note that, in FIG. 4 (discussed further herein), the output select switch that receives the RSEL(1) 64 signal is switch 82 and in FIG. 5, the output select switch that receives the RSEL(1) 64 signal is switch 156.

Note that other embodiments of the CDS Pixel 50 are possible. For example, in one embodiment, the TG switch 54 can be eliminated if the application in which the CDS Pixel 50 is being used does not need to disrupt integration to provide a hold phase. In still another embodiment, the output select switch (i.e., the RSEL switch 64) could be removed if the output does not need to be multiplexed onto a column bus. In still another embodiment, the IBIAS output load 70 (FIG. 2) could be replicated per pixel or even moved into the pixel if sharing the bias is not required to multiplex the output or to reduce power consumption. Other variations will, of course, be apparent.

It will also be recognized that the image sensing device can be fabricated on the same or different monolithic wafer from the Inverting AMP 56 and the various switches. In still further embodiments, some or all of the entire CDS Pixel 50, including the image sensing device and the Inverting AMP 56, are fabricated on the same CMOS wafer. In a still further embodiment, some, or all, of the entire CDS Pixel 50 is fabricated on an SLS structure. In still further embodiments, the image sensing device is fabricated on a separate wafer from the inverting amplifier 56 and feedback capacitor 58. Note that, in accordance with at least some embodiments, the TG 54 switch can be configured to be on the same wafer as the image sensing device 52 or on the same wafer as the Inverting AMP 56.

FIG. 3 is an exemplary timing diagram 100 showing the control signals for two rows of an [500×32] imager array using the block diagram of the CDS Pixel 50 of FIG. 2 (the SHR signal controls the RST switch 74 in this case) and creates a "rolling shutter" with a frame rate of 60 frames per second (FPS) (33 µs per row). This timing diagram is illustrative and not intended as limiting. The row length of 32 in the example timing diagram 100 assumes that the array is broken into groups of columns or "slices" for processing by an optional column concentration multiplexer. An illustrative example of a system and method usable for this type of processing is described in the commonly owned U.S. patent application Ser. No. 13/405,406, entitled IMAGER READOUT ARCHITECTURE UTILIZING A/D CONVERTERS (ADC), filed on Feb. 27, 2012, and published on Aug. 30, 2012 as publication number 20120218445, now U.S. Pat. No. 9,001,234, which is hereby incorporated by reference.

The integration time is controlled by how many rows (1 to 500) are accumulated, each row in the example of FIG. 3 corresponding to 33 µs. The output sample is held by CINT 58 (FIG. 2), enabling a global shutter if desired. The hold time of the CDS Pixel 50 (FIG. 2) is limited by the leakage current at the inverting input of the inverting amplifier 56, which may constrain the maximum useable hold time.

Again referring to FIG. 3, the first 33 µs phase 102 performs a hard reset 104 where the image sensing device(1) 52 voltage (and therefore charge) is initialized to a value determined by the unity-gain behavior of the Inverting AMP(1)'s 56 virtual short at its negative input, VIN(1) 61 (see FIG. 2), while the CDS Pixel(1) 50 is being loaded by the bias current, IBIAS 70. Capacitor CINT(1)'s 58 voltage is initialized to the difference between the virtual short voltage (VIN(1) 61 to the output of the Inverting AMP(1) 56) and the desired zero input charge output voltage, VDARK 72. Once TG(1) 54 is returned high, the image sensing device(1) 52 can start accumulating charge based on incident photons, and the Inverting AMP(1) 56 is disconnected from the output bus 69 (e.g., as shown in FIG. 3 by the pulse 104 at the start of the RSEL(1) signal). In one embodiment, the accumulation capacity of the image sensing device(1) 52, during period 106, is (optionally) enhanced by additional capacitance (e.g., optional second capacitor 57 as shown in FIG. 2) added in parallel with image sensing device(1) 52. The signal is output to the column bus 69 during period 108.

During the second 33 µs phase 106, the image sensing device(1) 52 continues to integrate while the subsequent image sensing device(2) through image sensing device(n) are being initialized (as determined by the respective RSEL(2) through RSEL(n) signals). While subsequent rows are initialized, any integrated charge on the respective CINT(2) through CINT(n) is cleared based on the output voltage of the selected row (uncorrelated to its own row's amplifier).

During the third 33 µs phase 108, the Inverting AMP(1) 56 is again connected to the bus 69 and CINT(1) 58 is re-correlated to the virtual short at the input of the Inverting AMP(1) 56 (by briefly closing switch SHR(1)) while loaded by the bias current, IBIAS 70. After this has settled, there is a non-overlapping period 110 followed by an output period 112 (designated in FIG. 3 as "Output Row 1"). To output the signal, the TG(1) switch 54 is closed which sums the image sensing device(1)'s 52 charge onto the input node of the Inverting AMP(1) 56. By the operation of the inverting input of the inverting AMP(1) 56, the output of the CDS Pixel(1) 50 (i.e., VOUT 68) changes from the reset value to a value which corresponds to transferring enough charge to CINT(1) 58 to cancel the accumulated charge of the image sensing device(1) 52, returning the image sensing device(1) 52 voltage back to its initialized value. An amplifier with a current (moving charge) input and voltage output is often referred to as a transimpedance amplifier (TIA).

The linearity of the charge-to-voltage conversion is negatively affected by the non-linear parasitics of CINT(1) 58. Advantageously, in at least some embodiments, a linear capacitor, such as a MIM or a metal finger capacitor, is used.

In at least some other embodiments, voltage coefficients are reduced by using larger series capacitors, such as by replacing CINT(1) 58 with two capacitors in series, e.g., CINT(1*a*) 58*a* and CINT(2*b*) 58*b* (not shown).

Referring again to FIGS. 2 and 3, after the charge transfer is complete, the image sensing device(1) 52 can be disconnected from the Inverting AMP(1) 56 to prevent further integration of incident photons. Since, as noted above, CINT(1) 58 was initialized to the difference between the image sensing device(1)'s 52 virtual short value and VDARK(1) 72, that amount of charge is already on CINT(1) 58, and is effectively subtracted from the required charge needed to cancel the image sensing device(1) 52 charge—effecting a correlation to the inverting amplifier 56 input offset and noise. CINT(1) 58 also enables sample-and-hold behavior where the hold time is limited by the total leakage current at the input summing node of the inverting amplifier 56. In further embodiments, each CDS Pixel 50 (column) output (i.e., VOUT 68) is read in parallel or is further multiplexed down to increase the effective column pitch.

Referring again to FIG. 3, the last 32 μs of the 33 μs phase 114 are used, in one embodiment, for a 32:1 column multiplexer timing where the inherent hold of the CDS Pixel 50 allows 1 μs for each of the 32 columns to drive a single open drain serial output bus 69. Alternately, in another embodiment, the same 32 columns drive 32 sample-and-hold circuits in a ROIC (not shown in the Figures, but described, for example, in the aforementioned and incorporated by reference U.S. Patent Publication US-2012-0218445-A1) which are multiplexed to create the serial sampled data stream. Illustrative examples of ROICs usable with at least some embodiments are described in the aforementioned and incorporated by reference co-pending patent application Ser. No. 13/405,406, as well as in commonly assigned and co-pending nonprovisional application Ser. No. 14/490,448, entitled "Foveal Imager ROIC," and filed on Sep. 18, 2014, which is likewise incorporated by reference.

The fourth 33 μs phase 114 of FIG. 3 shows how the second row of CDS pixels are selected to drive the common column bus 69 (either per column or group of columns with CDS output multiplexer). During this phase, the first row is in an idle state. Integration of the image sensing device(2) could be occurring since TG(1) is not active and the image sensing device(1) has been returned to its initial value. In one embodiment, this configuration is used only in extreme low light situations where the integration time was the entire frame time, but that is not limiting. In some instances, there is a sequence of soft resets (correlated to a group of rows or columns per bias current) to clear charge accumulated over the past line both on CINT 58 and image sensing device 52. The actual integration cycle is initialized by a hard reset, as per the first 33 μs phase where the output loading of the amplifier is identical to the environment it will see when the correlation and sample occur (one amplifier per bias current). Note that each pixel (column) of each row has its own image sensing device 52. The first and second row, in at least some embodiments, can be in different modes. In one embodiment, if the integration time is at its maximum, there may never be a hard reset where only the single row is reset. Note that, a soft reset is where multiple rows are reset simultaneously, but this can, in some instances, be less accurate.

In another embodiment, the CDS Pixel 50 acts as a CTIA. This is, for example, beneficial if the image sensing device 52 has minimal charge accumulation capacity. In this embodiment, CINT 58 is connected to the image sensing device 52 a plurality of times during the image accumulation phase and the charge is accumulated on CINT 58. The image integration time is now defined as the time from the last reset to the time the image signal voltage is read.

It will also be appreciated that the circuit of FIG. 2 and timing of FIG. 3 each have numerous applications and are not limited to the particular applications described in connection with FIGS. 2 and 3.

Referring to FIGS. 4 and 5, in these embodiments, the differential amplifier of FIG. 2 (i.e., the Inverting AMP 56), in one embodiment, is replaced with a CS amplifier (e.g., the NMOS amplifier 80 of FIG. 4, or the PMOS amplifier 152 of FIG. 5). For example, FIG. 4 is a block diagram showing one illustrative embodiment of an NMOS CDS pixel. In particular, FIG. 4 is a block diagram of a second embodiment of a CDS pixel 120, using NMOS devices and replacing the differential amplifier (Inverting AMP 56) of FIG. 2 with an inverting CS amplifier 80. As is apparent from the schematic diagram of FIG. 4, the CDS pixel 120 of FIG. 4 includes components similar to (and, in many instances similarly named and numbered as) those of FIG. 2, including an image sensing device 52 (e.g., a photodiode), a TG switch 54 that is coupled in series between the image sensing device 52 and the inverting CS amplifier 80, an RSEL transistor 82 responsive to an RSEL signal 64, a SHR switch 88 responsive to an SHR signal 60, an SHS switch 86 responsive to an SHS signal, and a RST switch 84 that is coupled between the input of the CS amplifier 80 and the SHS switch 86 (similar to the RST switch 74 of FIG. 2). CS amplifier 80 couples its output to the VOUT terminal 68 via the RSEL switch 82. In addition, the CDS pixel 120 includes a capacitor 58 coupled as a feedback to the CS amplifier 80, with a first terminal of the capacitor 58 coupled to the voltage input, VIN, of CS amplifier 80 (and also to the RST switch 84) and a second terminal coupled to the output of CS amplifier 80 via the SHS switch 86. In addition, the second terminal of capacitor 58 also is coupled to the source of dark voltage, VDARK 72, via SHR switch 88, similar to the configuration of FIG. 2. However, as a comparison of FIG. 2 and FIG. 4 illustrates, one difference is that the SHR signal 60 in FIG. 4 is routed so that it can control both the SHR switch 88 and also the RST switch 84.

FIG. 5 is a block diagram showing one illustrative embodiment of a six transistor (6T) PMOS CDS pixel 140. In particular, FIG. 5 is a block diagram of a third embodiment of a 6T CDS pixel 140 made using PMOS devices and replacing the differential amplifier of FIG. 2 with an inverting CS amplifier 152. As is apparent from the schematic diagram of FIG. 5, the CDS pixel 140 of FIG. 5 includes components similar to (and, in many instances similarly named and numbered as) those of FIG. 2, including an image sensing device 52 (e.g., a photodiode) coupled to a bias voltage VBIAS 66, a TG switch 54 that is coupled in series between the image sensing device 52 and the inverting CS amplifier 152, an RSEL transistor 156 responsive to an RSEL signal 64, a SHR switch 150 responsive to an SHR signal 60, and coupled to a source of dark voltage VDARK 66, an SHS switch responsive to an SHS signal 62, and a RST switch 154 that is coupled between the input of the CS amplifier 152 and the SHS switch (similar to the RST switch 74 of FIG. 2). CS amplifier 152 couples its output to the VOUT terminal 68 via the RSEL switch 156. In addition, the CDS PMOS pixel 140 includes a feedback capacitor 58 coupled as a feedback to the CS amplifier 152, with a first terminal of the capacitor 58 coupled to the voltage input of CS amplifier 152 (and also to the RST switch 154) and a second terminal coupled to the output of CS amplifier 152 via the SHS switch. In addition, the second terminal of capacitor 58 also is coupled to voltage source VDARK 72 via SHR switch 150 and the SHS switch, similar to the configuration of FIG. 2. However, as a comparison of FIG. 2 and FIG. 5 illustrates, one difference is that the SHR signal 60 in FIG. 5 is routed so that it can control both the SHR switch 150 and also the RST switch 154.

It is envisioned that the embodiments described herein also could be combined with some or all of the technologies described in the aforementioned, commonly assigned and incorporated by reference U.S. patents and patent applications, including but not limited to U.S. Pat. Nos. 7,215,270, 7,576,671, 7,605,652, 7,612,608, 7,860,189, 9,001,234, and 9,344,660, and U.S. Patent Publication Nos. US-2012-0218445-A1 and US-2015-0129747-A1. The contents of each of these above-listed patents and patent applications are hereby incorporated by reference in their entirety.

Throughout the present disclosure, absent a clear indication to the contrary from the context, it should be understood individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements have like or related alpha, numeric or alphanumeric designators. Further, while at least some of the embodiments described herein have been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the embodiments described herein, or the claims, must comprise more than one of that element, nor is it intended by illustrating a single element that the embodiments described herein, or the claims, are limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing the embodiments illustrated in the figures, specific terminology (e.g., language, phrases, etc.) may be used for the sake of clarity. These names are provided by way of example only and are not limiting. The described embodiments and listed claims are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, processes, military programs, etc. Such terminology used herein, however, is for the purpose of description and not limitation.

Although the embodiments disclosed herein have been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the embodiments and claims provided herein. Those of ordinary skill in the art will appreciate that the embodiments described herein can be modified to accommodate and/or comply with changes and improvements in the applicable technology and standards referred to herein. Variations, modifications, and other implementations of what is described herein can occur to those of ordinary skill in the art without departing from the spirit and the scope of the embodiments and claims provided herein. In addition, the technology disclosed herein can be used in combination with other technologies. Accordingly, the foregoing description is by way of example only and is not intended as limiting. In addition, all publications and references cited herein are expressly incorporated herein by reference in their entirety.

Having described and illustrated the principles of the technology with reference to specific implementations, it will be recognized that the technology can be implemented in many other, different, forms, and in many different environments. Having described the preferred embodiments, it will now become apparent to one of ordinary skill in the art that other embodiments incorporating their concepts may be used. These embodiments should not be limited to the disclosed embodiments, but rather should be limited only by the spirit and scope of the appended claims. The scope is defined in the following claims and the equivalents thereto.

The invention claimed is:

1. A first Correlated Double Sampled (CDS) pixel comprising:
   an inverting amplifier comprising an inverting input and an amplifier output configured to provide an output signal;
   an image sensing device which generates an image signal comprising charge based on image content, the image sensing device in operable communication with the inverting input, and configured to provide the image signal to the inverting input of the inverting amplifier;
   a first switch operably coupled in series between the image sensing device and the inverting input, the first switch configured for switchably connecting the image sensing device to the inverting input and controlling sample timing of the image signal;
   a second switch in operable communication with the amplifier output and a third switch, the second switch configured for switchably coupling the amplifier output as a CDS pixel output signal to an output bus;
   a first capacitor, comprising first and second terminals, the first terminal in operable communication with the first switch and the inverting input, and the second terminal in operable communication with the third switch and a fourth switch, wherein the first capacitor is configured to provide, via the second and third switches, a feedback loop from the amplifier output to the inverting input of the inverting amplifier and is configured to integrate the image signal;
   the third switch being in operable communication with the second switch, the second terminal of the first capacitor, and the fourth switch, wherein the third switch is configured to cooperate with the second switch to control sample timing of a correlated offset signal;
   the fourth switch being operably coupled in series between the second terminal of the first capacitor and a source of dark voltage $V_{dark}$, wherein $V_{dark}$ corresponds to a zero input charge output voltage; and further comprising a fifth switch operably connected between the inverting input and amplifier output, in parallel with the first capacitor and in operable communication with the first, second, and third switches, wherein the fifth switch is configured to create a virtual short at the inverting input;

wherein, when the image signal is reset to a first reset voltage, the fourth and fifth switches are configured to initialize the first capacitor to a difference voltage corresponding to a difference between a virtual short voltage to the amplifier output and $V_{dark}$;

wherein the first and third switches of the CDS pixel are configured to cause the first capacitor to store the correlated offset signal during a first time period and the image signal during a second time period distinct from the first time period; and wherein the difference voltage stored on the first capacitor is effectively subtracted from a required charge needed to cancel a charge at the image sensing device, to effect a correlation to input offset and noise associated with the inverting amplifier.

2. The first CDS pixel of claim 1, wherein the image sensing device comprises a photodiode.

3. The first CDS pixel of claim 1, wherein the first capacitor comprises a device that is formed at least in part using at least one of a Metal-Insulator-Metal (MiM) capacitance and a Metal Finger capacitance.

4. The first CDS pixel of claim 1, wherein the virtual short is configured to help control integration time.

5. The first CDS pixel of claim 1, wherein the second switch is configured to enable one or both of the first CDS pixel and a plurality of second CDS pixels to output as respective CDS pixel output signals onto the output bus.

6. The first CDS pixel of claim 1, wherein the charge is first accumulated by the image sensing device before being transferred to the first capacitor.

7. The first CDS pixel of claim 1, wherein the image sensing device further comprises a second capacitor operably coupled in parallel with the image sensing device, the second capacitor constructed and arranged to increase a charge capacity of the image sensing device.

8. The CDS pixel of claim 1, wherein the image sensing device is coupled to the CDS pixel using at least one of a monolithic wafer technology and a micro-electrical-mechanical (MEMS) technology.

9. The CDS pixel of claim 1, wherein the inverting amplifier and first capacitor are configured as a capacitive trans-impedance amplifier (CTIA) and wherein the first and third switches are configured to time the correlated offset signal and image signal so that the first capacitor is connected to the image sensing device a plurality of times during the first period so that charge is accumulated on the first capacitor, wherein the CTIA operates as a CDS CTIA.

10. A method for sensing an image, the method comprising:

providing a correlated double sampled (CDS) pixel having a CDS pixel output in operable communication with an output bus, the CDS pixel comprising:

an image sensing device which generates an output comprising an image signal comprising charge based on image control;

an inverting amplifier having an inverting input in operable communication with the output of the image sensing device, the inverting amplifier further comprising an amplifier output switchably coupled to the CDS pixel output;

a capacitor configured as a feedback from the amplifier output to the inverting input of the inverting amplifier, the capacitor configured to integrate an image signal received by the image sensing device;

a first switch in operable communication with the image sensing device, the capacitor, and the inverting input, the first switch configured to control sample timing of the image signal;

a second switch in operable communication with the amplifier output, the second switch configured for switchably coupling the amplifier output as a CDS pixel output signal to an output bus;

a third switch in operable communication with the second switch and the capacitor, the third switch configured to cooperate with the second switch to control sample timing of a correlated offset signal; and setting a voltage across the image sensing device to a first predetermined value during a first period, the first predetermined value comprising a value based at least in part on a unity-gain behavior of the inverting amplifier when a virtual short is applied between the amplifier output and inverting input, while the CDS pixel is being loaded by a bias current;

initializing a voltage across the capacitor, during the first period, to a second predetermined value corresponding to an offset voltage, the offset voltage based at least in part on a difference between the value at the amplifier output when the virtual short is applied, and a predetermined zero input charge output voltage;

disconnecting the CDS pixel output from the output bus during a second period distinct from the first period;

accumulating charge on the image sensing device, the charge related to a detected image intensity, during the second period;

correlating the second predetermined value of voltage across the capacitor to the virtual short at the inverting input of the inverting amplifier, to result in creation of the correlated offset signal during a third period distinct from the first and second periods, wherein the correlated offset signal is correlated to input offset and noise associated with the inverting amplifier;

reconnecting the CDS pixel output to the output bus during the third period;

transferring the accumulated charge from the image sensing device to the capacitor during a fourth period distinct from the first, second, and third periods, so that the capacitor stores the image signal; and coupling, during a fifth period, the image sensing device to the inverting input of the inverting amplifier, wherein the coupling combines, at the inverting input of the inverting amplifier, the image signal comprising stored charge from the image sensing device with the correlated offset signal plus the previously transferred image signal stored in the capacitor;

wherein the feedback of the correlated offset signal plus image signal stored in the capacitor to the inverting input is effective to subtract, at the amplifier output, the correlated offset signal from the stored image signal from the image sensing device, to produce a CDS pixel output signal, at the amplifier output, having offset and 1/f noise removed from it; and wherein enough charge is transferred from the image sensing device to return the image sensing device to the first predetermined value, wherein a correlated output is communicated from the CDS pixel output to the output bus.

11. The method of claim 10, further comprising:
operably coupling the first capacitor to the image sensing device a plurality of times during the time when the image sensing device is accumulating charge; and
defining an image integration time as the time from when the image sensing device is returned to the first predetermined value to the time an image signal voltage is read.

12. The first CDS pixel of claim 1, wherein the inverting amplifier comprises a common source configured device to be a predominant gain element for the inverting amplifier.

13. The first CDS pixel of claim 1, wherein the first capacitor and first, second and third switches are configured to:
sample, during a reset period, the correlated offset signal and store on the first capacitor charge representative of an offset signal;
transfer to the first capacitor, during a transfer period, charge representative of the image signal; and
subtract from the amplifier output, during the transfer period, the stored charge representative of the offset signal.

14. The method of claim 10, wherein the CDS pixel further comprises a fourth switch operably coupled in series between the second terminal of the first capacitor and a voltage source having a value of Vdark, wherein Vdark corresponds to the zero input charge output voltage; and
a fifth switch operably connected between the inverting input and amplifier output, in parallel with the first capacitor and in operable communication with the first, second, and third switches, the fifth switch configured to create the virtual short between the amplifier output and the inverting input;
wherein, when the image signal is reset to a first reset voltage, the fourth and fifth switches are configured to initialize the first capacitor to the offset voltage corresponding to a difference between Vdark and the first reset voltage.

15. A Correlated Double Sampled (CDS) pixel, comprising:
an image sensing device which generates an output comprising an image signal comprising charge based on image content;
an inverting amplifier in operable communication with the output of the image sensing device, the inverting amplifier comprising an inverting input and an amplifier output, the amplifier output providing an output signal switchably coupled to a CDS pixel output;
a feedback capacitor configured as a feedback from the amplifier output to the inverting input, the feedback capacitor configured to integrate the image signal from the image sensing device;
a select switch configured for switchably connecting the CDS pixel output signal to an output bus;
a sample and hold (SHS) switch in operable communication with the select switch and the feedback capacitor, the SHS switch configured to control sample timing of a correlated offset signal;
a transfer gate switch operably connected in series between the image sensing device and inverting input and also configured to be in operable communication with the feedback capacitor, the transfer gate switch configured to control sample timing of the image signal;
a reset switch operably connected as a virtual short between the amplifier output and the inverting input, in parallel with the feedback capacitor, wherein the reset switch is in operable communication with the transfer gate switch and the SHS switch, wherein the reset switch is configured to help control integration time; and
a sample and hold reset (SHR) switch configured to switchably couple the feedback capacitor to a zero input charge output voltage $V_{dark}$, wherein the SHR switch also is in operable communication with the SHS switch;
wherein, when the image signal is reset to a first reset voltage, the reset and SHR switches are configured to initialize the feedback capacitor to a difference voltage corresponding to a difference between a virtual short voltage to the amplifier output and $V_{dark}$;
wherein the transfer gate switch and select switch cooperate to store on the feedback capacitor the correlated offset signal during a first time period and the image signal during a second time period different from the first time period; and
wherein the difference voltage stored on the feedback capacitor is effectively subtracted from a required charge needed to cancel a charge at the image sensing device, to effect a correlation to input offset and noise associated with the inverting amplifier.

16. The CDS pixel of claim 15, wherein the feedback capacitor, transfer gate switch, SHS switch, and select switch are configured to:
sample, during a reset period, the correlated offset signal and store on the feedback capacitor charge representative of an offset signal;
transfer to the feedback capacitor, during a transfer period, charge representative of the image signal; and
subtract from the amplifier output, during the transfer period, the stored charge representative of the offset signal.

17. The CDS pixel of claim 15, wherein the CDS pixel is configured to:
during a first period, sample and store a first charge, representing an offset voltage, onto the feedback capacitor;
during a second period distinct from the first period, transfer a second charge from the image sensing device to the feedback capacitor and subtract the stored offset charge from the amplifier output signal by action of the inverting amplifier; and
during a third period distinct from the first and second periods, couple the output signal, minus offset and 1/f noise, to the output bus.

18. The CDS pixel of claim 1, wherein the CDS pixel is configured to:
during the first period, sample and store a first charge, representing an offset voltage, onto the first capacitor;
during the second period, transfer a second charge from the image sensing device to the first capacitor and subtract the stored offset charge from the amplifier output signal by action of the inverting amplifier; and
during a third period distinct from the first and second periods, couple the output signal, minus offset and 1/f noise, to the output bus.

19. The CDS pixel of claim 9, wherein the first capacitor has a value defining an input charge-to-output voltage gain of the CTIA.

20. The method of claim 10, wherein the CDS pixel further comprises:

a fourth switch operably connected between the inverting input and amplifier output, in parallel with the capacitor, the fourth switch configured to create the virtual short at the inverting input; and a fifth switch operably coupled in series between the second terminal of the first capacitor and a source of dark voltage $V_{dark}$, wherein $V_{dark}$ corresponds to the zero input charge output voltage; and wherein the method further comprises configuring the fourth and fifth switches to initializing the voltage across the capacitor to a difference between a virtual short voltage to the amplifier output and Vdark.

* * * * *

UNITED STATES PATENT AND TRADEMARK OFFICE
CERTIFICATE OF CORRECTION

PATENT NO. : 9,787,923 B2
APPLICATION NO. : 14/595383
DATED : October 10, 2017
INVENTOR(S) : Eugene M. Petilli Page 1 of 1

It is certified that error appears in the above-identified patent and that said Letters Patent is hereby corrected as shown below:

In the Specification

Column 6, Line 37 delete "Amp" and replace with --AMP--.

In the Claims

Column 12, Line 54 delete "and the inverting input" and replace with --and the amplifier input--.

Column 13, Line 65 delete "control" and replace with --content--.

Column 17, Line 12 delete "Vdark" and replace with --$V_{dark}$--.

Signed and Sealed this
Fourth Day of June, 2019

Andrei Iancu
*Director of the United States Patent and Trademark Office*